(12) United States Patent
Abbas et al.

(10) Patent No.: US 6,810,046 B2
(45) Date of Patent: Oct. 26, 2004

(54) METHOD OF COMMUNICATING DATA IN COMMUNICATION SYSTEMS

(75) Inventors: Ghani A. M Abbas, Nottingham (GB); Peter J Livermore, Beeston (GB); Philip a Arnold, Rugby (GB); Bernard J Goatly, Kimberley (GB)

(73) Assignee: Marconi UK Intellectual Property Ltd., Coventry (GB)

( * ) Notice: Subject to any disclaimer, the term of this patent is extended or adjusted under 35 U.S.C. 154(b) by 826 days.

(21) Appl. No.: 09/751,294

(22) Filed: Dec. 28, 2000

(65) Prior Publication Data

US 2002/0031146 A1 Mar. 14, 2002

(30) Foreign Application Priority Data

Jan. 14, 2000 (GB) .............................................. 0000791

(51) Int. Cl.[7] .................................................. H04J 3/22
(52) U.S. Cl. ...................................... 370/545; 370/474
(58) Field of Search ............................. 370/242–4, 252, 370/473, 474, 476, 503–520, 532–545

(56) References Cited

U.S. PATENT DOCUMENTS

| | | | |
|---|---|---|---|
| 4,501,000 A | | 2/1985 | Immink et al. |
| 5,490,142 A | | 2/1996 | Hurlocker |
| 6,292,495 B1 | * | 9/2001 | Von Hammerstein et al. ... 370/465 |
| 6,650,630 B1 | * | 11/2003 | Haartsen ..................... 370/345 |

FOREIGN PATENT DOCUMENTS

| | | |
|---|---|---|
| EP | 0 540 007 A2 | 5/1993 |
| EP | 0 663 776 A2 | 7/1995 |
| WO | WO 99/59278 | 11/1999 |
| WO | WO 99/63703 | 12/1999 |

* cited by examiner

Primary Examiner—David Vincent
(74) Attorney, Agent, or Firm—Kirschstein, et al.

(57) ABSTRACT

The invention pertains to a communication system (300) including one or more communication channels (10), each channel comprising a transmitter unit (20) and a receiver unit (40). Each transmitter unit (20) is connected through an optical fiber link (30) to its associated receiver unit (40). In operation, each receiver unit (20) receives payload data from its associated sending client and adds overhead data to the payload data to generate corresponding aggregate data (600). The aggregate data of each transmitter unit (20) is conveyed through the fiber link (30) to its associated receiver unit (40) which receives the aggregate data, decodes it to separate the payload data from the overhead data and then outputs the payload data to its associated receiving client. The receiver unit (40) interprets the overhead data and uses it for controlling and managing the payload data in the system (300). The one or more channels of the system (300) are capable of adapting to the bit data rate of their associate payload data; thus, the channels are capable of operating mutually asynchronously, thereby circumventing a need for justification in the aggregate data. Moreover, each transmitter unit (20) is operable to add the overhead data to the payload data when generating the aggregate data so that the number of payload bits relative to the number of overhead bits is in a fixed ratio of 31:1. Such a fixed ratio renders the aggregate data simpler to decode and bit error rate easier to determine therefrom.

29 Claims, 6 Drawing Sheets

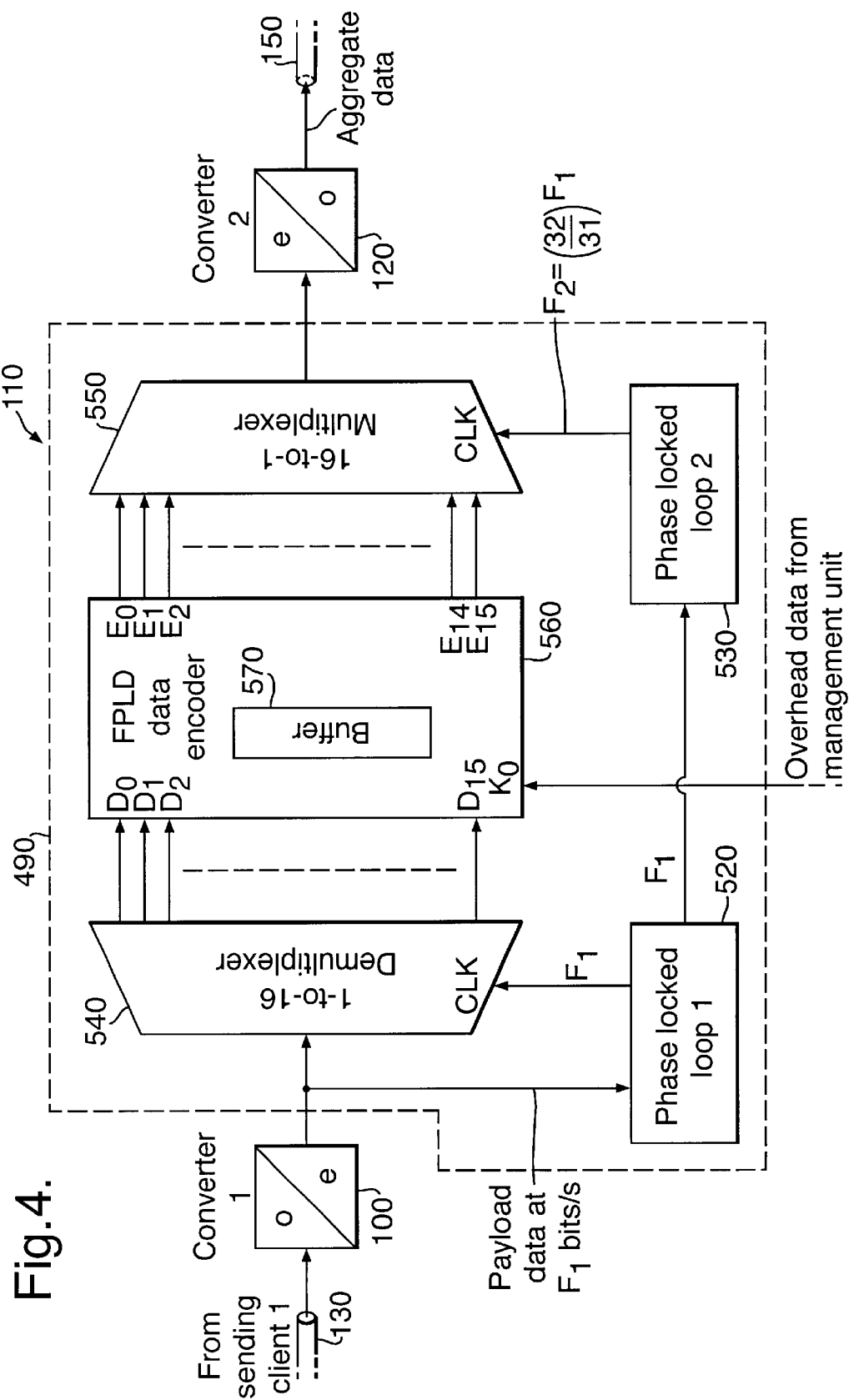

Fig.5.

| O/H bit A1 | 31 bits P/L | O/H bit A2 | 31 bits P/L | O/H bit A3 | 31 bits P/L | O/H bit A4 | 31 bits P/L | O/H bit A5 | 31 bits P/L | O/H bit A6 | 31 bits P/L | O/H bit A7 | 31 bits P/L | O/H bit A8 | 31 bits P/L |
|---|---|---|---|---|---|---|---|---|---|---|---|---|---|---|---|
| O/H bit B1 | 31 bits P/L | O/H bit B2 | 31 bits P/L | O/H bit B3 | 31 bits P/L | O/H bit B4 | 31 bits P/L | O/H bit B5 | 31 bits P/L | O/H bit B6 | 31 bits P/L | O/H bit B7 | 31 bits P/L | O/H bit B8 | 31 bits P/L |
| O/H bit C1 | 31 bits P/L | O/H bit C2 | 31 bits P/L | O/H bit C3 | 31 bits P/L | O/H bit C4 | 31 bits P/L | O/H bit C5 | 31 bits P/L | O/H bit C6 | 31 bits P/L | O/H bit C7 | 31 bits P/L | O/H bit C8 | 31 bits P/L |
| O/H bit D1 | 31 bits P/L | O/H bit D2 | 31 bits P/L | O/H bit D3 | 31 bits P/L | O/H bit D4 | 31 bits P/L | O/H bit D5 | 31 bits P/L | O/H bit D6 | 31 bits P/L | O/H bit D7 | 31 bits P/L | O/H bit D8 | 31 bits P/L |
| O/H bit E1 | 31 bits P/L | O/H bit E2 | 31 bits P/L | O/H bit E3 | 31 bits P/L | O/H bit E4 | 31 bits P/L | O/H bit E5 | 31 bits P/L | O/H bit E6 | 31 bits P/L | O/H bit E7 | 31 bits P/L | O/H bit E8 | 31 bits P/L |
| O/H bit F1 | 31 bits P/L | O/H bit F2 | 31 bits P/L | O/H bit F3 | 31 bits P/L | O/H bit F4 | 31 bits P/L | O/H bit F5 | 31 bits P/L | O/H bit F6 | 31 bits P/L | O/H bit F7 | 31 bits P/L | O/H bit F8 | 31 bits P/L |
| O/H bit G1 | 31 bits P/L | O/H bit G2 | 31 bits P/L | O/H bit G3 | 31 bits P/L | O/H bit G4 | 31 bits P/L | O/H bit G5 | 31 bits P/L | O/H bit G6 | 31 bits P/L | O/H bit G7 | 31 bits P/L | O/H bit G8 | 31 bits P/L |
| O/H bit H1 | 31 bits P/L | O/H bit H2 | 31 bits P/L | O/H bit H3 | 31 bits P/L | O/H bit H4 | 31 bits P/L | O/H bit H5 | 31 bits P/L | O/H bit H6 | 31 bits P/L | O/H bit H7 | 31 bits P/L | O/H bit H8 | 31 bits P/L |

31 bits P/L = 31 bits of payload data
O/H bit x = overhead data bit x

Fig.6.

MULTIFRAME STRUCTURE

|  | Frame 1 | Frame 2 | Frame 3 | Frame 4 | Frame 5 | Frame 6 | Frame 7 | Frame 8 |
|---|---|---|---|---|---|---|---|---|
| Byte 1 | Byte $A_1$ = FAW1 | Byte $A_2$ = TTI | Byte $A_3$ = TTI | Byte $A_4$ = TTI | Byte $A_5$ = TTI | Byte $A_6$ = APS1 | Byte $A_7$ = FDI | Byte $A_8$ = PTI |
| Byte 2 | Byte $B_1$ = FAW2 | Byte $B_2$ = TTI | Byte $B_3$ = TTI | Byte $B_4$ = TTI | Byte $B_5$ = TTI | Byte $B_6$ = APS2 | Byte $B_7$ = BDI | Byte $B_8$ = BSPA |
| Byte 3 | Byte $C_1$ = FAW3 | Byte $C_2$ = TTI | Byte $C_3$ = TTI | Byte $C_4$ = TTI | Byte $C_5$ = TTI | Byte $C_6$ = APS3 | Byte $C_7$ = FQI | Byte $C_8$ = SPA |
| Byte 4 | Byte $D_1$ = FAW4 | Byte $D_2$ = TTI | Byte $D_3$ = TTI | Byte $D_4$ = TTI | Byte $D_5$ = TTI | Byte $D_6$ = APS4 | Byte $D_7$ = BQI | Byte $D_8$ = SPA |
| Byte 5 | Byte $E_1$ = BIP | Byte $E_2$ = BIP | Byte $E_3$ = BIP | Byte $E_4$ = BIP | Byte $E_5$ = BIP | Byte $E_6$ = BIP | Byte $E_7$ = BIP | Byte $E_8$ = BIP |
| Byte 6 | Byte $F_1$ = MIC | Byte $F_2$ = BAL | Byte $F_3$ = BAL | Byte $F_4$ = BAL | Byte $F_5$ = BAL | Byte $F_6$ = BAL | Byte $F_7$ = BAL | Byte $F_8$ = BAL |
| Byte 7 | Byte $G_1$ = SPA | Byte $G_2$ = BAL | Byte $G_3$ = BAL | Byte $G_4$ = BAL | Byte $G_5$ = BAL | Byte $G_6$ = BAL | Byte $G_7$ = BAL | Byte $G_8$ = BAL |
| Byte 8 | Byte $H_1$ = SPA | Byte $H_2$ = BAL | Byte $H_3$ = BAL | Byte $H_4$ = BAL | Byte $H_5$ = BAL | Byte $H_6$ = BAL | Byte $H_7$ = BAL | Byte $H_8$ = BAL |

US 6,810,046 B2

METHOD OF COMMUNICATING DATA IN COMMUNICATION SYSTEMS

BACKGROUND OF THE INVENTION

The present invention relates to a method of communicating data in communication systems, in particular but not exclusively in optical communication systems. The invention also relates to a communication system operating according to the method.

In conventional optical communication systems comprising arrays of interconnected nodes, information is conveyed from a first node to a second node by modulating optical radiation generated in the first node and guiding the radiation, for example along optical fibre waveguides, to the second node whereat the radiation is detected and demodulated to yield the information thereat. The modulation can be either of digital or analogue form.

When digital modulation is employed, it is conventional practice to modulate a radiation source such as a laser between two states corresponding to two mutually different laser radiation output levels. Conversely, when analogue modulation is employed, for example to convey time division multiplexed analogue speech information, the laser is modulated in a continuous manner over a range of optical radiation intensities.

When assessing the quality of optical communication in the conventional systems employing analogue modulation, it is relatively straightforward to measure signal-to-noise ratio performance at the second node. However, if the analogue modulating signal is modulated with digital data, it is extremely difficult to determine a corresponding bit error rate performance at the second node; the bit error rate does not correlate in a simple manner with signal-to-noise ratio performance. Moreover, it is also problematical to include digital overhead control information when analogue modulation is employed.

In the conventional communication systems employing digital modulation, additional digital information can be added to sending client payload data for determining bit error rate and for control purposes. Such conventional systems are operable to receive sending client payload data at the first node and arrange it into fixed length blocks of data to which overhead control data is added to provide aggregate data for transmission. Examples of such conventional systems will now be described with reference to published patent applications and granted patents.

In a published European patent application no. EP 0 663 776, there is described a method of communicating block coded digital data with associated synchronization and control data. In the method, block coded digital data is communicated with associated overhead data in a data stream having a succession of coded blocks. Each block contains N symbols wherein M of the symbols comprise information to be transmitted and the remaining N-M of the symbols comprise error correcting data. The ratio M/N comprises a first information rate. The coded blocks in the data stream are divided into a succession of frames, each frame comprising F of the coded clocks. A frame overhead symbol is added for each of the frames to provide data necessary for a receiver function such as synchronization. The addition of the frame overhead symbols effectively lowers the first information rate to a second information rate M'/N' as provided in Equation 1 (Eq. 1):

$$\frac{M}{N} = \frac{(M' + b)}{(N' + b)} \qquad \text{Eq. 1}$$

where
b=an integer chosen to provide the second information rate at a desired value.
N is less than $2^n+1$, where n is the number of bits in each of the symbols. The number of coded blocks F in each frame is determined from Equation 2 (Eq. 2):

$$F = \frac{M'P}{(N - M)b} \qquad \text{Eq. 2}$$

where
P=a smallest value integer that will render F an integer, P being equal to the number of overhead symbols added per frame.

A plurality of X of the frames are formed into a multi-frame containing FX coded blocks and PX frame overhead symbols. X is chosen to provide enough n-bit frame overhead symbols to implement the desired receiver function.

In another published European patent application no. EP 0 540 007, there is described a method and apparatus for transmitting an information-bearing signal by:
(a) generating a plurality of block signals on the basis of the information-bearing signal;
(b) generating a plurality of parity block signals on the basis of the plural data block signals;
(c) generating a frame signal containing the plural data block signals and the parity block signals; and
(d) sending out the frame signal.

In the method, each of the data block signals includes a first block synchronizing signal indicating the start of the data block signal, a data signal containing the information signal and a first parity signal derived by encoding the data signal. Each of the parity lock signals includes a second block synchronizing signal indicating the start of the parity block signal, a second parity signal and a third parity signal. Bit signals located at same bit positions in the respective second parity signals are derived by encoding bit signals located at the same positions in the respective data signals. Bit signals located at the same bit positions in the respective third parity signals are derived by encoding the bit signals located at the same bit positions in the respective first parity signals; alternatively, the third parity signal in each parity block signal is derived by encoding the second parity signal in each parity block signal.

In an international application no. PCT/FI99/00477, there are described data transmission methods in a telecommunication system. The methods are concerned with employing "payload numbering" instead of or in addition to conventional frame numbering. Data in the system is split into fixed-length data blocks or payload units. The size of a block is preferably equal to or smaller than the shortest information field in frames of the protocols used. Each protocol frame carries one or more payload units. In an optimum situation, the length of the information field in a protocol frame equals n times the length of the payload unit where n in an integer. Alternatively or additionally, the protocol frame carries payload numbers both for indicating the payload units conveyed in the protocol frame and for acknowledging the received blocks.

In a United States granted patent no. U.S. Pat. No. 5,490,142, there is described a VT group optical extension interface and VT group optical extension format method. In the method, a VT group extension format defines a transport frame for the transfer of 135 bytes, each byte comprising 8 bits, the format providing a line rate of 8 640 Mbit/s. Each frame comprises a transport overhead portion and a payload portion. The transport portion comprises 27 bytes and defines various operations, administration and maintenance functions. Moreover, the payload portion comprises 108 bytes which directly correspond to one VT group of an STS-N frame. The VT group optical extension format line rate is determined an as integer multiple m of an STS-N network element clock where m is 6 if N is 1 and m is 18 if N is 3. An optical extension interface is provided between a VTG bus and an optical extension, the interface being responsive to the provision of a multiplexed VT group payload provided on the VTG bus for providing a corresponding VT group optical extension transport frame on the optical extension, the interface being further responsive to the provision of a VT group optical extension transport frame on the optical extension for providing a multiplexed VT group payload and associated path overhead to the VTG bus.

It is conventional practice in contemporary optical communication systems where sending client data does not precisely partition into the blocks to partially fill the blocks with sending client data and then to add additional justification code after the sending client data to ensure that the blocks are completely filled. This practice is known as justification and assists to ensure, for example, satisfactory radiation spectra within the conventional systems.

The amount of justification employed is a function of the payload data that can vary from client to client. When the aggregate data is received at the second node, the overhead information is isolated and interpreted, and then the blocks of data are processed to remove the justification to yield the payload data. Thus, it is not possible to perform a bit error rate measurement for the aggregate data at the second node without completely decoding the aggregate data to isolate the payload data; such complete decoding is a complex process.

In large and complex communication systems including many thousands of nodes and employing the aforementioned digital modulation, it is often desirable to be able to monitor the aggregate data modulated onto the optical radiation at sub-nodes intermediate between the first and second nodes to determine error occurrence thereat. Such monitoring is especially useful when the first and second nodes are spatially separated by several hundred kilometres and the optical radiation is conveyed therebetween through a number of fibres and associated optical repeaters and regenerators. Determination of error rate at the sub-nodes enables the performance of specific parts of the systems to be measured, for example the quality of repeaters therein or the transmission media employed. Such measurement enables defective repeaters and fibres to be isolated and, if necessary, bypassed or replaced. The systems suffer a problem that error rate at the sub-nodes cannot easily be determined without fully decoding the aggregate data to determine bit error rate; this problem arises on account of justification being employed.

It is conventional practice for communication system operators to lease communication channels to clients on the contractual basis of bit error rate not exceeding a contract specified limit. In the case of communication systems employing analogue modulation, guaranteeing bit error rate performance is difficult to determine based on signal-to-noise measurement. Likewise, in the case of communication systems employing digital modulation with justification, bit error rate can be measured but requires complete demodulation of the aggregate data to determine bit error rate.

SUMMARY OF THE INVENTION

The inventors have appreciated that it is possible to employ an alternative method of encoding data in a communication system that addresses the aforementioned problems.

According to a first aspect of the present invention, there is provided a method of communicating data in communication systems, each system including at least one channel comprising transmitting means, receiving means and data conveying means for conveying data from the transmitting means to the receiving means, the method characterized in that it includes the steps of:

(a) combining payload data and overhead data at the transmitting means to form aggregate data thereat for transmission to the receiving means, the aggregate data being partitioned into frame-like structures in which the number of overhead data bits is in a fixed ratio relative to the number of payload data bits;

(b) transmitting the aggregate data from the transmitting means to the receiving means through the conveying means;

(c) receiving the aggregate data at the receiving means, decoding the aggregate data to isolate the overhead data from the payload data thereat, and interpreting the overhead data for controlling and managing the payload data within the system, characterized in that the transmitting means (20) is operable to generate the aggregate data (600) at a rate which is greater than the rate of receipt of the payload data thereat by substantially a fraction $^{(Rp+Ro)}/_{(Rp)}$, where Rp is the rate of receipt of the payload data at the transmitting means (20) and Ro is the rate at which the overhead data is added at the transmitting means (20) to generate the aggregate data (600).

The method provides at least one of the advantages that:

(a) the amount of timing jitter in the aggregate data propagating through the system is capable of being reduced, thereby reducing the occurrence of errors within the system; and (b) error checking performance of the system is capable of being improved, for example bit error rate is more readily determinable from the aggregate data on account of the fixed ratio.

A frame-like structure in aggregate data comprising overhead data and payload data is defined as an arrangement of the overhead data such that the arrangement substantially repetitively occurs in the aggregate data and is operable to partition the payload data within the aggregate data.

Advantageously, depending upon application of the system operable according to the method, the fixed ratio of payload bits to overhead bits is in a range of 2:1 to 100:1. A ratio higher than 100:1 can result in synchronization problems at the receiving means, hence the aforementioned range is a practical compromise. Preferably, the fixed ratio of payload bits to overhead bits is 31:1.

Justification of payload data within aggregate data can result in complex methods being required to decode the aggregate data. The inventors have appreciated in the method of the invention that it is advantageous not to apply further justification to the received payload data when generating the aggregate data.

Conveniently, the system operable according to the method includes a plurality of channels, each channel capable of adapting to the data rate of its associated payload data, the channels thereby capable of functioning mutually asynchronously. Such asynchronous operation is important to circumvent a need for performing justification in the system, thereby providing benefits of simplified aggregate data decoding in the receiving means. In order to achieve such asynchronous operation in practice, it is desirable that each channel includes phase locked loop means for synchronizing the channel to its associated payload data.

In order to render the overhead data included in the aggregate data less vulnerable to burst interference, the overhead data and the payload data are preferably interleaved in the aggregate data.

Advantageously, the frame-like structures employed within the aggregate data comprise a plurality of frames organized into multiframes, the frames and multiframes identifiable at the receiving means by interpreting the position of overhead data within the aggregate data. The overhead data thereby provides the beneficial function of synchronization of overhead data at the receiving means. However, data block structure present within the payload data can be asynchronous to the frames and multiframes as a consequence, although this does not affect system operation.

The inventors have found in practice that each multiframe conveniently comprises in a range of 2 to 100 frames. This range is chosen as a compromise between being able to include a number of specialized functions within the overhead data but not have so many frames in each multiframe so that multiframe synchronization at the receiving means becomes problematical. In practice, it is preferable for each multiframe to comprise eight frames.

The aforementioned specialised functions advantageously incorporate a synchronization function. Thus, it is convenient that the overhead data associated with each multiframe comprises a synchronization code (FAW) for assisting the receiving means to synchronization to the multiframes. For example, the synchronization code can comprise four synchronization bytes, FAW1 to FAW4, in the overhead data. Moreover, the four synchronization bytes FAW1 to FAW4 can have, for example, binary values of 1111 0110$_b$, 1111 0110$_b$, 0010 1000$_b$ and 0010 1000$_b$ allocated thereto respectively.

When ensuring that multiframes in the aggregate data are not lost when communicated through the conveying means, it is desirable that the overhead data associated with each multiframe comprises an identity code (MIC) for use in identifying the multiframe. Missing multiframes are preferably identified at the receiving means by determining whether or not the identity code is incremented in a consistent manner for successive multiframes. Inconsistent incrementation is indicative of missing multiframes received at the receiving means. Conveniently, the identity code is incremented in modulo manner, for example in modulo 255; this enables a single byte to be used in the overhead data for representing the code. In practice, it is found particularly beneficial to increment the identity code in steps of a plurality of counts, for example in steps of 3 counts, for successive multiframes. In practice, inclusion of the MIC code is also found to assist with synchronization of the receiving means to the aggregate data.

Ensuring correct d.c. level stability from photodetectors used to detect the aggregate data can be problematical where a.c. coupling is employed to remove d.c. offsets from such photodetectors. In order to address this problem, the overhead data associated with each multiframe advantageously comprises balancing code (BAL) for ensuring that the overhead bytes associated with the multiframe include substantially equal numbers of 0's and 1's.

Moreover, ensuring that channel connections are correctly made in the system, it is desirable for the overhead data to include identity information regarding at least one of the transmitting means and the receiving means. Thus, conveniently, the overhead data associated with each multiframe comprises trail trace identification code (TTI) for use by the receiving means for confirming whether or not it is connected to its correct corresponding transmitting means.

In communication systems including a plurality of channels, failure of one or more of the channels can occasionally occur in practice. It is therefore desirable that the overhead data should be capable of invoking a channel substitution in the event of channel failure. Thus, preferably, the overhead data associated with each multiframe comprises automatic protection switching code (APS) for instructing the system to use alternative channels to convey the payload data in the event of failure of a channel within the system.

When interference occurs in the conveying means, damage to the aggregate data will often be limited to individual frames. It is therefore preferable that the overhead data associated with each multiframe comprises a bit interleaved parity (BIP) code for each frame of the multiframe, the interleaved parity code usable by the receiving means for detecting the occurrence of corruption of payload data associated with the frame. As a consequence of the number of overhead bits being in a fixed ratio relative to the number of payload bits, the BIP code provides a direct indication of bit error rate in the aggregate data; such a direct indication enables relatively simple monitors to be used for measuring bit error rate along the conveying means, for example for fault finding purposes. Thus, unlike prior art systems, the method of the invention provides a fixed density of error rate indicating code relative to client payload data irrespective of client payload data rate.

In order to assist the receiving means to synchronise correctly to the aggregate data and apply appropriate processing, for example regeneration, it is desirable that the overhead data includes an indication of the aggregate data rate at which the channel is expected to operate. Thus, advantageously, the overhead data associated with each multiframe comprises a payload type indicator (PTI) code indicative of payload data rate supplied to the transmitting means.

The method of the invention is applicable to communication systems operating at serial bit rates approaching 10 Gbits/s and greater. It is presently relatively difficult and expensive to provide logic switching devices capable of operating at such high bit rates. Therefore, it is highly desirable to convert high bit rate serial data into parallel data to ease processing tasks performed in the transmitting means and also in the receiving means. Thus, advantageously, the transmitting means is operable to receive the payload data as serial data and convert it to parallel data for combining with the overhead data to generate the aggregate data as serial data for transmission through the conveying means.

In a practical communication system, it is preferable that the conveying means comprises one or more optical fibre waveguides for conveying the aggregate data, the aggregate data being modulated onto optical radiation, for example radiation generated by a distributed feedback (DFB) laser source, which is guided from the transmitting means to the receiving means along the one or more fibre waveguides. In order to utilized fibre bandwidth to greater extent, it is desirable that a plurality of channels of the system are optically multiplexed along a single optical fibre waveguide of the conveying means.

Alternatively, for example where system portability is an important consideration, the conveying means advantageously comprises a radio link or an electrical coaxial cable for conveying the aggregate data.

According to a second aspect of the present invention, there is provided a communication system operable according to the method of the first aspect of the invention.

When implementing the system in practice, it is found advantageous for the transmitting means to incorporate an adapter unit for combining the payload data with the overhead data to generate the aggregate data, and for the receiving means to incorporate a corresponding adapter unit for separating the payload data from the overhead data. Each adapter unit beneficially includes one or more phase locked loop clock circuits for synchronization the units to data input applied thereto.

Communication systems usually have to service the requirements of several clients. Thus, conveniently, the system includes a plurality of channels operable to adapt to the rate at which they receive payload data, the channels thereby capable of operating mutually asynchronously. Such asynchronous operation enables the system to accommodate payload data being supplied from different clients at mutually different payload bit rates without a need to employ justification in the aggregate data.

In a third aspect of the present invention, there is provided a method of communicating data in communication systems, each system including a plurality of channels, each channel comprising transmitting means, receiving means and data conveying means for conveying data from the transmitting means to the receiving means, the method characterized in that it includes the steps of:
(a) synchronization at each transmitting means to its associated incoming payload data and then combining the payload data with overhead data thereat to form aggregate data for transmission to the receiving means associated with the transmitting means, the aggregate data being partitioned into frame-like structures and the channels capable of operating mutually asynchronously;
(b) transmitting the aggregate data from the transmitting means to the receiving means through the conveying means; and
(c) receiving the aggregate data at the receiving means, decoding the aggregate data to isolate the overhead data from the payload data thereat, and interpreting the overhead data for controlling and managing the payload data within the system.

In a fourth aspect of the present invention, there is provided a method of communicating data in communication systems, each system including at least one channel comprising transmitting means, receiving means and data conveying means for conveying data from the transmitting means to the receiving means, the method characterized in that it includes the steps of:
(a) combining payload data and overhead data at the transmitting means to form aggregate data thereat for transmission to the receiving means, the aggregate data being partitioned into frame-like structures in which the overhead data includes balancing codes (BAL) for substantially equalising the occurrence of 0's and 1's in the overhead data;
(b) transmitting the aggregate data from the transmitting means to the receiving means through the conveying means; and
(c) receiving the aggregate data at the receiving means, decoding the aggregate data to isolate the overhead data from the payload data thereat, and interpreting the overhead data for controlling and managing the payload data within the system.

In a fifth aspect of the present invention, there is provided a method of communicating data in communication systems, each system including at least one channel comprising transmitting means, receiving means and data conveying means for conveying data from the transmitting means to the receiving means, the method characterized in that it includes the steps of:
(a) combining payload data and overhead data at the transmitting means to form aggregate data thereat for transmission to the receiving means, the aggregate data being partitioned into frame-like structures comprising frames grouped into multiframes where each frame has associated therewith a bit interleaved parity code (BIP) indicative of whether or not payload data associated with the frame is corrupted;
(b) transmitting the aggregate data from the transmitting means to the receiving means through the conveying means; and
(c) receiving the aggregate data at the receiving means, decoding the aggregate data to isolate the overhead data from the payload data thereat, and interpreting the overhead data for controlling and managing the payload data within the system and determining from the interleaved parity code whether or not frames within the aggregate data are corrupted.

In a sixth aspect of the present invention, there is provided a method of communicating data in communication systems, each system including at least one channel comprising transmitting means, receiving means and data conveying means for conveying data from the transmitting means to the receiving means, the method characterized in that it includes the steps of:
(a) combining payload data and overhead data at the transmitting means to form aggregate data thereat for transmission to the receiving means, the aggregate data being partitioned into frame-like structures devoid of justification;
(b) transmitting the aggregate data from the transmitting means to the receiving means through the conveying means; and
(c) receiving the aggregate data at the receiving means, decoding the aggregate data to isolate the overhead data from the payload data thereat, and interpreting the overhead data for controlling and managing the payload data within the system.

In a seventh aspect of the present invention, there is provided a method of communicating data in communication systems, each system including at least one channel comprising transmitting means, receiving means and data conveying means for conveying data from the transmitting means to the receiving means, the method characterized in that it includes the steps of:
(a) combining payload data and overhead data at the transmitting means to form aggregate data thereat for transmission to the receiving means, the aggregate data being partitioned into frame-like structures comprising frames grouped into multiframes where each multiframe has associated therewith a multiframe identity code (MIC) which is incremented from multiframe-to-multiframe and is indicative of whether or not multiframes are missing in the aggregate data;
(b) transmitting the aggregate data from the transmitting means to the receiving means through the conveying means; and
(c) receiving the aggregate data at the receiving means, decoding the aggregate data to isolate the overhead data from the payload data thereat, and interpreting the overhead data for controlling and managing the payload data within the system and determining from the multiframe identity code whether or not multiframes within the aggregate data are missing.

In an eighth aspect of the present invention, there is provided a communication system operating according to the method of any one of the third to seventh aspects of the invention.

BRIEF DESCRIPTION OF THE DRAWINGS

Embodiments of the invention will now be described, by way of example only, with reference to the following diagrams in which:

FIG. 4 is a diagram of an alternative adapter unit included within the communication channel illustrated in FIG. 1;

FIG. 5 is a representation of a data frame structure used in the channel and system illustrated in FIGS. 1 and 2 respectively, the frame structure including client payload data interleaved with overhead data in a fixed ratio of 31:1; and FIG. 6 is a representation of overhead bytes of a multi-frame structure used in the channel and system illustrated in FIGS. 1 and 2 respectively, the multiframe structure including eight frame structures of a type illustrated in FIG. 5.

DETAILED DESCRIPTION OF THE PREFERRED EMBODIMENTS

Figure 1:
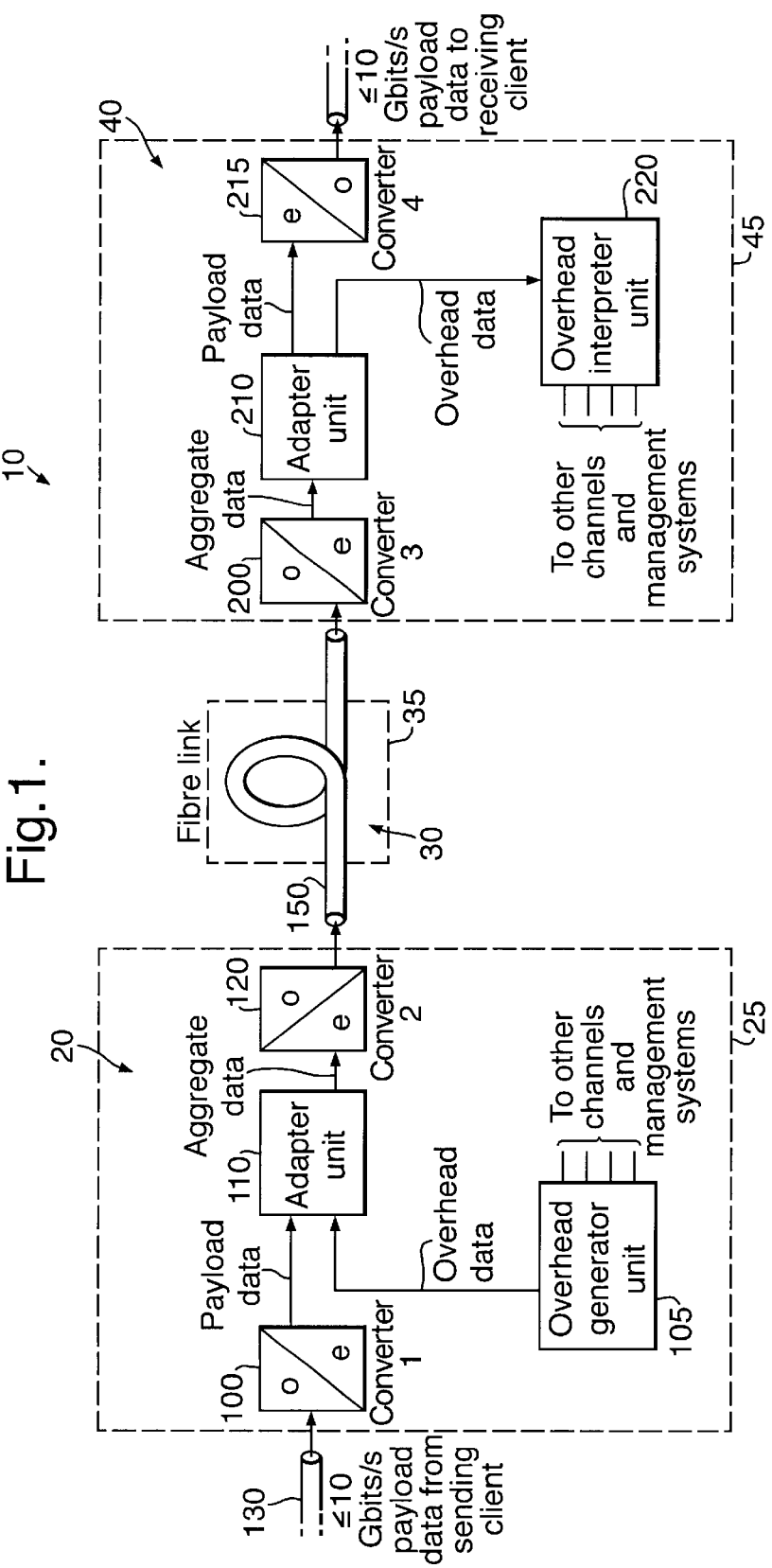
FIG. 1 is a schematic illustration of a communication channel of a communication system according to the invention.

Referring to FIG. 1, there is shown a communication channel of a communication system according to the invention; the channel is indicated generally by 10. The channel 10 comprises a transmitter unit 20, an optical fibre link 30 and a receiver unit 40 shown enclosed within dashed lines 25, 35, 45 respectively.

In broad overview, the channel 10 operates by the transmitter unit 20 receiving payload data at its input from a sending client (not shown). The transmitter unit 20 proceeds to encode the payload data by arranging it into frames and multiframes to which are added overhead data to provide corresponding aggregate data. The aggregate data is conveyed as modulated optical radiation from the transmitter unit 20 through the fibre link 30 to the receiver unit 40. The receiver unit 40 receives the modulated radiation and derives therefrom the aggregate data. Moreover, the receiver unit 40 decodes the aggregate data to separate out the overhead data from the payload data, and then outputs the payload data to a receiving client (not shown). Moreover, the overhead data present in the aggregate data is interpreted by the receiver unit 40 and enables it to apply management and control functions. These functions will be described in more detail later and include path trace, automatic protection switching (APS), bit interleaved parity (BIP), forward and backward quality indication (FQI and BQI), forward and backward defect indication (FDI and BDI).

Component parts of the channel 10 will now be described in more detail.

The transmitter unit 20 includes a first optical-to-electrical converter 100, an overhead generator unit 105, an adapter unit 110 and a second electrical-to-optical converter 120. The first converter 100 is connected at its optical input to the sending client through an optical fibre 130. An electrical output from the converter 100 is connected to a first electrical input of the adapter 110. Moreover, overhead data generated in the overhead unit 105 is conveyed through an electrical connection connecting the overhead unit 105 to a second electrical input of the adapter unit 110. An electrical output from the adapter unit 110 is connected to an electrical input of the second converter 120. Moreover, the fibre link 30 is connected at its first end to an optical output of the second converter 120. The overhead generator unit 105 is also connected to overhead generator units of other channels, and also to local and regional management systems (not shown in FIG. 1).

The receiver unit 40 comprises a third optical-to-electrical converter 200, an adapter unit 210, a fourth electrical-to-optical converter 215 and an overhead generator unit 220. The third converter 200 is connected at its optical input to a second end of the fibre link 30. An electrical output of the converter 200 is connected to an electrical input of the adapter 210. The adapter 210 includes first and second electrical outputs; the first output is connected to an electrical input of the fourth converter 215 and the second output is connected to an input of the overhead interpreter unit 220.

The interpreter unit 220 is also connected to interpreter units of other channels, to a local management system and also to the aforementioned regional management system (not shown in FIG. 1). An optical output from the converter unit 215 is connected through an optical fibre to the receiving client (not shown).

In operation, the first converter 100 receives payload data from the sending client through the fibre 130. The transmitter unit 20 is designed to accommodate payload data from the sending client at bit data rates of up to 10 Gbits/second and greater. The converter 100 converts the payload data into a corresponding electrical signal that propagates from the electrical output of the converter 100 to the first electrical input of the adapter unit 110. The overhead unit 105 receives management instructions from the local and regional management systems and generates corresponding overhead data that propagates to the second electrical input of the adapter unit 110. The adapter unit 110 then interleaves the overhead data with the payload data such that 31 bits of payload data are accompanied by 1 bit of overhead data in a fixed ratio of 31:1. The adapter unit 110 assembles the interleaved data into frames, each frame comprising 2048 bits of which 1984 bits and 64 bits correspond to payload data and overhead data respectively. Moreover, the adapter unit 110 further assembles frames into groups of eight frames, thereby generating corresponding multiframes. Structures of the frames and multiframes will be described in more detail later. The multiframes are output at the electrical output of the adapter unit 110 in the form of the aggregate data that propagates to the electrical input of the second converter 120. The converter 120 converts the aggregate data into corresponding digitally modulated optical radiation which is output at the optical output into the fibre link 30 along which the radiation propagates to the receiver unit 40; the converter 40 includes a modulated infra-red laser operable to output radiation at a wavelength in the order of 1550 nm.

The third converter 200 receives the modulated radiation and converts it to a corresponding electrical signal that the adapter unit 210 receives at its electrical input; this conversion is performed by optical amplifiers, regenerators and associated photodetectors within the converter 200. The adapter unit 210 processes the electrical signal corresponding to the aggregate data by stripping out the overhead data therefrom and passing it to the interpreter unit 220. The adapter unit 210 further decodes the frames and multiframes to extract the payload data that is output from the adapter unit 210 to the electrical input of the fourth converter 215. The converter 215 converts the payload data and modulates it onto optical radiation which is output at the optical output of the converter 215 and propagates to the receiving client.

The form of the aggregate data in the channel 10 is distinguished from conventional communication systems in that the number of bits of overhead data and payload data in the aggregate data is always in a fixed ratio. Moreover, justification is not employed with a consequence that blocks of data provided by the sending client are asynchronous to the frames and multiframes of the channel 10. As a consequence of the adapter unit 210 stripping out the overhead data and decoding the frames and multiframes, transmission from the sending client to the receiving client is transparent in the sense that the receiving client will be unaware that frames and multiframes are used to convey the payload data through the channel 10.

On account of justification not being used in the channel 10 and the number of bits of payload data to overhead data being in a fixed ratio, it is much easier to determine bit error rate in the channel 10 not only at the receiver unit 40 but also at sub-nodes (not shown) along the fibre link 30. Such ease of bit error rate determination allows, in a communication system incorporating a plurality of channels similar to the channel 10, defective channels to be more easily identified and, if necessary, corresponding protection channels to be selected in substitution.

Figure 2:
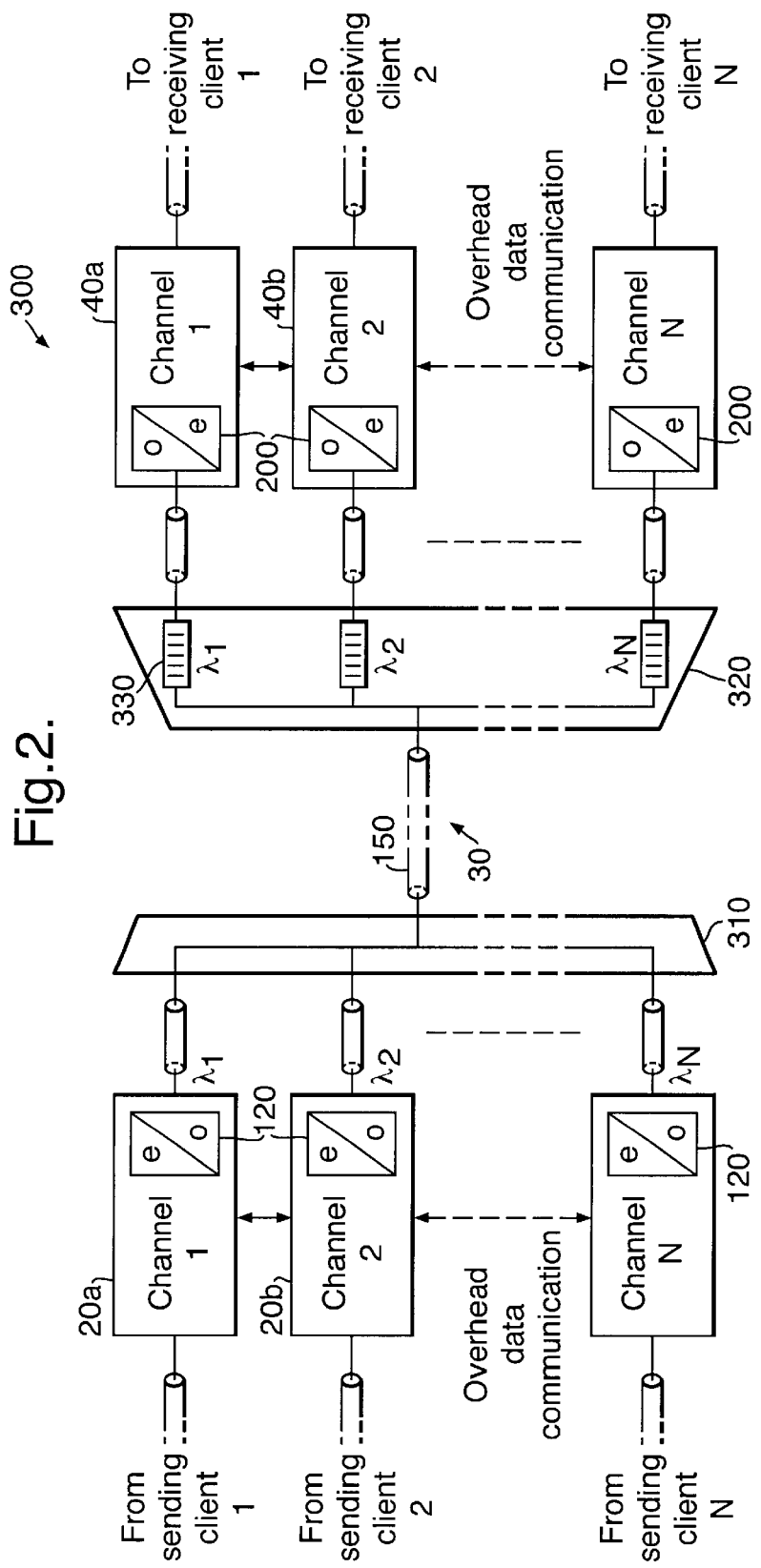
FIG. 2 is a schematic illustration of a communication system according to the invention incorporating a plurality of communication channels as shown in FIG. 1.

A communication system can be constructed according to the invention that comprises a plurality of channels similar to the channel 10 where modulated optical radiation is optically multiplexed along a single optical fibre link. Such a system is illustrated in FIG. 2 and indicated generally by 300.

The system 300 comprises N transmitter units, for example transmitter units 20a, 20b corresponding to channels 1 and 2 respectively. Each transmitter unit 20 is connected at its optical input to a corresponding sending client, for example the channels 1 and 2 are connected to sending clients 1 and 2 respectively. The transmitter units 20 are interconnected at their associated overhead generator units 105 so that, for example, sending client 1 payload data can be directed through channel N in the event of channel 1 becoming defective as in protection switching. Optical outputs from the transmitter units 20 are connected to an optical multiplexer 310 which combines the outputs to provide a composite optical output. The composite output is connected to the first end of the fibre 150 of the fibre link 30. The second converters 120 of the transmitter units 20 in the system 300 are configured to output their optical radiation at mutually different wavelengths. For example, the converters 120 of the channels 1, 2 and N can be configured to output optical radiation at nominal wavelengths of 1550, 1560 and 1600 nm respectively, although other wavelengths can alternatively be used if necessary.

The fibre 150 is connected at its second end to an optical demultiplexer 320 comprising a plurality of Bragg grating optical filters, for example a filter 330, for isolating radiation components provided from the multiplexer 310 corresponding to each transmitter unit 20. The demultiplexer 320 is connected at its optical outputs to associated receiver units 40 that are in turn connected to associated receiving clients. The receiver units 40 are interconnected at their respective interpreter units 220 so that functions such as switching to a protection channel, for example channel N, can be implemented in the event of another channel developing a fault.

In operation, payload data received from the sending clients is encoded in the transmitter units 20 to generate corresponding aggregate data thereat. The aggregate data of each transmitter unit 20 is modulated onto optical carrier radiation whose nominal wavelength is specific to each transmitter unit 20. The optical radiation output from the transmitter units 20 is optically combined in the multiplexer 310 to generate the composite radiation that propagates through the fibre link 30.

The demultiplexer 320 receives the composite radiation at its optical input and filters out aggregate radiation corresponding to each transmitter unit 20. The aggregate radiation propagates to its respective receiver unit 40 that then decodes the aggregate data to provide payload data to its associated receiving client.

When a large number of channels are required, for example several hundred channels, the system 300 can be duplicated to provide an enlarged system comprising several multiplexers, demultiplexers and optical fibre links. Each transmitter unit and receiver unit in such an enlarged system can be connected to other transmitter units and receiver units respectively for providing functions such as protection switching in the event of a fibre link, a demultiplexer or a multiplexer become defective.

Each channel in the system 300 adapts to the rate at which payload data is supplied from its respective sending client. Thus, the channels in the system 300 are capable of functioning mutually asynchronously. Such adaptation within the channels to the rates at which payload data is supplied by sending clients is performed within the adapter units 110, 210 of each channel.

Figure 3:
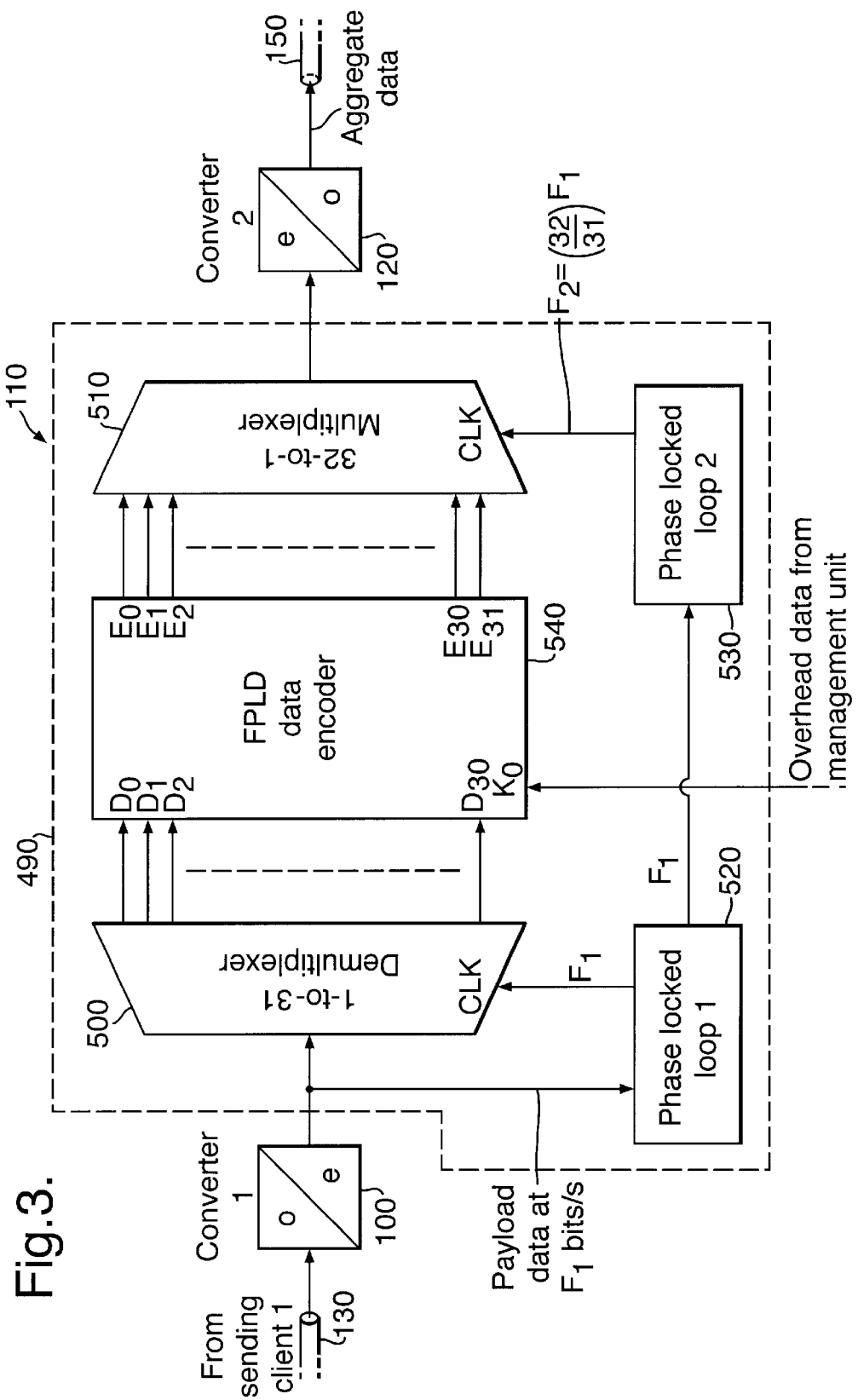
FIG. 3 is a diagram of an adapter unit included within the communication channel illustrated in FIG. 1.

Although the system 300 shown in FIG. 3 is operable to provide communication links from the sending clients to the receiving client, it will be appreciated that bi-directional communication between the sending clients and the receiving clients is provided by including corresponding reverse directed channels (not shown) from the receiving clients to the sending clients, the reverse directed channels being of similar design to the channels illustrated in FIGS. 1 and 2.

In order to further describe asynchronous operation of the channels, the adapter unit 110 will be described in more detail with reference to FIG. 3. The ability of the channels of the system 300 to function mutually asynchronously circumvents the need for justification in the aggregate data, thereby enabling a fixed ratio of payload bits to overhead bits to be achieved which greatly simplifies overhead functions such as determination of bit error rate (BER), and also reduces jitter in the aggregate data propagating in the channel 10 and the system 300.

The adapter unit 110, shown included within a dashed line 490, comprises a 1-to-31 demultiplexer 500, a 32-to-1 multiplexer 510, a first phase locked loop (PLL1) 520, a second phase locked loop (PLL2) 530 and a data encoder 540. The encoder 540 is implemented as a field programmable logic device (FPLD), for example as manufactured by Xilinx Inc.

The electrical output from the first converter 100 is connected to a serial data input of the demultiplexer 500 and to a reference input of the PLL1 520. A first output from the PLL1 520 is connected to a clocking input CLK of the demultiplexer 500. Moreover, a second output from the PLL1 520 is connected to a reference input of the PLL2 530. The demultiplexer 500 comprises parallel outputs $D_0$ to $D_{30}$ which are connected to corresponding data inputs of the data encoder 540. The overhead unit 105 comprises an overhead data output connected to an overhead data input $K_0$ of the encoder 540. The encoder 540 further comprises parallel data outputs $E_0$ to $E_{31}$ connected to corresponding parallel inputs of the multiplexer 510. An output of the PLL2 530 is connected to a clocking input CLK of the multiplexer 510. The multiplexer 510 includes a multiplexed output connected to the electrical input of the second converter 120.

In broad overview, the adapter unit 110 functions by receiving serial payload data from the first converter 100 at a bit rate of up to 10 Gbits/s or greater. The PLL1 520 synchronizes itself to the payload data and generates a corresponding synchronized clocking signal which clocks continuously even when the payload data remains at a particular logic state for several clock cycles. The PLL1 520 clocks both the demultiplexer 500 and the PLL2 530. The payload data is converted from a serial bit stream to 31-bit wide parallel words in the demultiplexer 500. The payload data is transferred in 31-bit words from the demultiplexer 500 to the encoder 540. The encoder 540 adds one bit of overhead data received from the overhead generator unit 105 to every 31 bits of payload data in a fixed ratio to provide output words at the outputs $E_0$ to $E_{31}$. The output words are passed to the multiplexer 510 which converts the output words into a corresponding serial data stream, namely the aggregate data, that passes to the second converter 120 whereat it is modulated onto optical radiation for transmission along the fibre 150. Inclusion of the demultiplexer 500 provides the benefit that the encoder 540 receives data in the form of words and does not need to be capable of clocking at the rate of payload data which can approach 10 Gbits/s; the encoder 540 clocks at rates in the order of 300 MHz when the bit rate of payload data approaches 10 Gbits/s. However, the demultiplexer 500 is designed to be capable of handling up to 10 Gbits/s or greater serial data bit rates.

Inclusion of the overhead data into the aggregate data means that the bit data rate in the aggregate data is 32/31 times greater than the payload traffic presented from the sending client to the adapter unit 110. It is the purpose of the PLL2 530 to provide a clocking signal at a rate $F_2$ which is frequency locked to the clocking signal at a rate $F_1$ provided from the PLL1 520. The clocking signal from the PLL2 530 clocks the multiplexer 510 at a rate 32/31 times greater than the demultiplexer 500 is clocked by the PLL1 520. Such a bit rate transformation prevents an accumulation of payload data in the adapter unit 540 which would occur if the demultiplexer 500 and multiplexer 510 were clocked at identical rates.

At the adapter unit 210, a reverse operation to that which occurs in the adapter unit 110 is performed. In the reverse operation, the aggregate data is firstly loaded into a 1-to-32 demultiplexer operable to convert serial data into 32-bit word data, then the overhead bit is extracted from the 32-bit word data to yield a 31-bit word which is passed to a 31-to-1 bit multiplexer to convert the 31-bit word into corresponding serial payload data. The adapter unit 210 also incorporates two PLLs as shown in FIG. 3 except that the second PLL connected to the multiplexer is operable to provide a 31/32 times frequency conversion. Moreover, the data encoder 540 included within the adapter unit 110 is substituted with a decoder in the adapter unit 210 which is operable to output overhead data to its associated interpreter unit 220.

In practice, procuring 1-to-31 demultiplexers and 32-to-1 multiplexers for the transmitter units 20a, 20b, and likewise 1-to-32 demultiplexers and 31-to-1 multiplexers for the receiver units 40a, 40b is not easy when 10 Gbits/s serial data bit rate performance is demanded. Standard proprietary multiplexers and demultiplexers capable of operating a this bit rate are often 16-to-1 and 1-to-16 devices. When such proprietary parts are employed in the adapter unit 110, the unit 110 is implementable as illustrated in FIG. 4.

In FIG. 4, a 1-to-16 demultiplexer 540 is used instead of the demultiplexer 500 in FIG. 3. Moreover, a 16-to-1 multiplexer 550 is used instead of the multiplexer 510 in FIG. 3. Furthermore, an FPLD data encoder 560 including a buffer memory 570 is used instead of the encoder 540 in FIG. 3.

In operation, payload data in the form of a serial bit stream passes from the converter 100 into the demultiplexer 540 which converts the serial stream into corresponding 16-bit parallel words. The words are loaded by the encoder 560 into its buffer memory 570 to provide payload data therein. The encoder 560 then adds an appropriate overhead bit to each concurrent group of 31 bits of payload data within the memory 570 to generate aggregate data therein and then proceeds to output the aggregate data in words of 16-bits length to the multiplexer 550. The multiplexer 550 converts the 16-bit words to a serial bit stream of aggregate data which is then output from the encoder unit 110 to the second converter 120 for modulation therein onto optical radiation for transmitting along the fibre 150.

Bit rate conversion occurring at the adapter units 110, 120 circumvents the need to justify the aggregate data, thereby simplifying the aggregate data and enabling sub-node assessment of bit error rate to be made.

The aggregate data, as described briefly above, is serial data and is punctuated into frames and multiframes by virtue of bit values of the overhead data added in a fixed ratio to the payload data at the adapter unit 110. Eight frames in sequence in the aggregate data form a multiframe. The structure of a frame is illustrated in FIG. 5 and indicated by 600. Each frame 600 commences with an overhead bit A1 that is followed by 31 bits of sending client payload data (31 bits P/L) that, in turn, is followed by an overhead bit A2 and so on. For example, an overhead bit A8 in the aggregate data is followed by 31 bits of payload data that, in turn, is followed by an overhead bit B1 and so on. The frame 600 terminates with an overhead bit H8 followed by 31 bits of payload data. As illustrated in FIG. 5, each bit of overhead data in the frame 600 is accompanied by 31 bits of payload data in a fixed ratio of 1:31.

The aggregate data corresponding to the frame 600 can be regarded conceptually as the frame 600 being read-out row-by-row, as represented by an arrow 610 indicating row direction and an arrow 620 indicating column direction. The frame 600 is thus read-out from its top left-hand corner (START) to its bottom right-hand corner (END) row-by-row to provide the aggregate data.

In the frame 600, the overhead bits A1 to A8 form a byte A, the overhead bits B1 to B8 form a byte B, and so on. Hence, the overhead bits for each frame can be represented as illustrated in Table 1 as eight bytes; the payload data from the sending client is not shown in the table.

TABLE 1

Overhead Byte A
Overhead Byte B
Overhead Byte C
Overhead Byte D
Overhead Byte E
Overhead Byte F
Overhead Byte G
Overhead Byte H Eight frames similar to the frame 600 are output in sequence in the aggregate data to form a multiframe. The overhead bytes of the eight frames comprising the multiframe can be represented by symbols where byte $A_x$ corresponds to the overhead byte A of frame x where a subscript x is in a range of 1 to 8. Thus, a byte $A_1$ corresponds to an overhead byte A of the first frame in the multiframe and a byte $H_8$ corresponds to an overhead byte H of the eighth frame in the multiframe.

For convenience, the overhead bytes of the multiframe can be arranged in tabular form as in Table 2.

TABLE 2

| Frame 1 | Frame 2 | Frame 3 | Frame 4 | Frame 5 | Frame 6 | Frame 7 | Frame 8 |
| --- | --- | --- | --- | --- | --- | --- | --- |
| Byte $A_1$ | Byte $A_2$ | Byte $A_3$ | Byte $A_4$ | Byte $A_5$ | Byte $A_6$ | Byte $A_7$ | Byte $A_8$ |
| Byte $B_1$ | Byte $B_2$ | Byte $B_3$ | Byte $B_4$ | Byte $B_5$ | Byte $B_6$ | Byte $B_7$ | Byte $B_8$ |
| Byte $C_1$ | Byte $C_2$ | Byte $C_3$ | Byte $C_4$ | Byte $C_5$ | Byte $C_6$ | Byte $C_7$ | Byte $C_8$ |
| Byte $D_1$ | Byte $D_2$ | Byte $D_3$ | Byte $D_4$ | Byte $D_5$ | Byte $D_6$ | Byte $D_7$ | Byte $D_8$ |
| Byte $E_1$ | Byte $E_2$ | Byte $E_3$ | Byte $E_4$ | Byte $E_5$ | Byte $E_6$ | Byte $E_7$ | Byte $E_8$ |
| Byte $F_1$ | Byte $F_2$ | Byte $F_3$ | Byte $F_4$ | Byte $F_5$ | Byte $F_6$ | Byte $F_7$ | Byte $F_8$ |

TABLE 2-continued

| Frame 1 | Frame 2 | Frame 3 | Frame 4 | Frame 5 | Frame 6 | Frame 7 | Frame 8 |
|---------|---------|---------|---------|---------|---------|---------|---------|
| Byte $G_1$ | Byte $G_2$ | Byte $G_3$ | Byte $G_4$ | Byte $G_5$ | Byte $G_6$ | Byte $G_7$ | Byte $G_8$ |
| Byte $H_1$ | Byte $H_2$ | Byte $H_3$ | Byte $H_4$ | Byte $H_5$ | Byte $H_6$ | Byte $H_7$ | Byte $H_8$ |

In the aggregate data, the overhead bytes appear in a sequence, although punctuated by payload data, such that byte $A_1$ is followed by byte $B_1$ and so on to byte $H_1$ followed by byte $A_2$ and so on until byte $H_8$ at the end of the multiframe.

The units 105, 220 use the overhead bytes for performing a number of overhead functions which will now be described with reference to FIG. 6; this diagram shows a representation of overhead bytes of a multiframe structure used in the channel 10 and the system 300. The overhead bytes perform different functions, for example as indicated by abbreviations in the diagram, namely:

FAW: "frame alignment word"; MIC: "multiframe identity code";
BAL: "balancing byte"; SPA: "spare byte";
TTI: "trail trace identifier"; APS: "automatic protection channel";
FDI: "forward defect indication"; BDI: "backward defect indication";
FQI: "forward quality indicator"; BQI: "backward quality indicator";
PTI: "payload type indicator"; and BIP: "bit interleaved parity".

In the system 10, the overhead generator unit 105 generates the overhead bytes shown in FIG. 6. Values of some of the overhead bytes are determined locally at the overhead unit 105 whereas others are generated in response to commands received from the aforementioned local and regional management systems, for example TTI values. In other words, the overhead bytes are generated on the basis of information provided either internally within the transmitter unit 20 or from the aforementioned management systems. These bytes are communicated in the aggregate data to the adapter unit 210 which isolates the overhead bytes and passes them to the interpreter unit 220 for interpretation.

The interpreter unit 220 uses the overhead bytes FAW1, FAW2, FAW3, FAW4 to identify where multiframes start in the aggregate data, namely for synchronizing to multiframes. In the channel 10 and the system 300, these bytes FAW1, FAW 2, FAW3, FAW4 have fixed values of 1111 0111 0$_b$, 1111 0110$_b$, 0010 1000$_b$, 0010 1000$_b$ respectively where a subscript b indicates a binary number. Alternative values can be used for these bytes FAW1 to FAW4 provided that the values provide the channel 10 and system 300 with the capability of synchronizing to multiframes.

The multiframe identity code MIC is a byte value which is incremented by the overhead generator unit 105 for each subsequent multiframe. For example a first multiframe has a MIC value 0000 0001$_b$, a second multiframe following the first multiframe has a MIC value 0000 0010$_b$ and so on; when the identity code reaches a value 1111 1111$_b$ for the 255$^{th}$ multiframe, the MIC resets to a 0000 0000$_b$ value again for the 256$^{th}$ multiframe and so on in a modulo 255 manner. Incrementation in other moduli, for example in modulo 8, is also possible for the MIC code instead of using modulo 255.

The interpreter unit 220 is operable to monitor the identity code and ensure that correct incrementation occurs; any errors in incrementing the MIC are identified by the interpreter unit 220 as indicative of missing multiframes. Moreover, inclusion of the MIC code into the aggregate data assists the receiver unit 40 to synchronize to the aggregate data, namely frame alignment is improved thereby at the receiver unit 40.

As an option, the MIC value can be incremented by more than 1 count for each subsequent multiframe, for example incrementation can be in steps of three counts so that a typical MIC counting sequence could be 1111 1110$_b$ (decimal 254) for a first multiframe, 0000 0001$_b$ (decimal 1) for a second multiframe, 0000 0100$_b$ (decimal 4) for a third multiframe and so on.

The interpreter unit 220 uses the balancing overhead bytes BAL for d.c. restoration purposes. The value of the balancing bytes are set by the overhead generator unit 105 so that for each of the frames 2 to 8 of the multiframe represented in FIG. 6, the number of 0's and 1's in its associated overhead bytes are equal. Such balancing is advantageous when photodetectors having their electrical outputs a.c. coupled to remove d.c. offset are employed in the channel 10 and system 300 for converting radiation modulated with the aggregate data into electrical signals for the adapter unit 210 and its associated interpreter unit 220.

The multiframe in FIG. 6 also includes spare bytes SPA which are unallocated initially but can be allocated by system users to perform additional functions after commissioning the system 300 if such functions are found to be necessary to assist system operation. The generator and interpreter units 105, 220 are software controlled and are therefore susceptible to being performance upgraded by software modification.

The trail trace identifier overhead bytes TTI comprise a 16-byte string which is included from frame 2 overhead byte $B_2$ to frame 5 overhead byte $D_5$ as illustrated in FIG. 6. Bytes 2 to 16 of the string are user definable ASCII characters and byte 1 of the string includes a CRC-7 checksum value generated by the overhead unit 105 in accordance with an ITU communication specification G. 707 Annex B which is hereby incorporated by reference. The string is used by the system 300 to ensure that a receiving client is connected to its correct corresponding sending client.

The automatic protection channel overhead bytes APS1 to APS4, namely frame 6 overhead bytes $A_6$ to $D_6$, are used by the system 300 when a defective channel therein has to be bypassed and another channel of the system 300 allocated in substitution to convey its payload data. The interpreter unit 220 interprets these overhead bytes to determine whether or not its associated channel is to be bypassed and the identity of an alternative channel of the system 300 allocated in substitution. The overhead and interpreter units 105, 220 are operable in combination with the aforementioned local and regional management systems to determine interconnections within the system 300 when substitution occurs for routing payload data from an affected sending client to its associated receiving client.

The forward defect indication overhead byte FDI, namely frame 7 overhead byte $A_7$, is used in the channel 10 and system 300 to indicate downstream, namely on the receiving client's end of the fibre link 30, that a defect condition has been detected upstream, namely towards the corresponding sending client. Likewise, the backward defect indication byte BDI, namely frame 7 overhead byte $B_7$, when a receive path defect is detected, namely on the receiving client's end of the fibre link 30. FDI and BDI overhead bytes thereby enable the location of a defect in the system 300 to be easily and rapidly identified.

The forward quality indication overhead byte FQI, namely frame 7 overhead byte $C_7$, is used for conveying a bit error count for a preceding multiframe. Thus, the FQI is used for indicating downstream an error occurring upstream. Likewise, the backward quality indication byte BQI, namely frame 7 overhead byte $D_7$, is used for conveying a bit error count for the payload data of the preceding multiframe.

The payload type indicator overhead byte PTI, namely frame overhead byte $A_8$, is used for indicating composition of the payload data or the maintenance status of a communication path conveying the multiframe and its associated payload data. For example, interpretations for the overhead byte PTI are according to Table 3.

TABLE 3

| PTI byte binary value | Interpretation applied by the interpreter unit 220 |
| --- | --- |
| 0000 | Unequipped, namely there is a complete communication path from the sending client to the receiving client but the client has not connected his equipment to the path |
| 0001 | Indicates a linear transponder mode, namely that a signal is being conveyed which does not require digital regeneration and hence any regenerators along the path should be switched off |
| 0010 | Indicates that the payload data rate is 155.52 Mbit/s (STM-1 mode) and requires adapter unit retiming/regeneration at this rate |
| 0011 | Indicates that the payload data rate is 622.08 Mbits/s (STM-4 mode) and requires adapter unit retiming/regeneration at this rate |
| 0100 | Indicates that the payload data rate is 1.0625 Gbits/s (fibre channel) and requires adapter unit retiming/regeneration at this rate |
| 0101 | Indicates that the payload data rate is 1.25 Gbits/s (as in Gigabit Ethernet) and requires adapter unit retiming/regeneration at this rate |
| 0110 | Indicates that the payload data rate is 2.48832 Gbits/s (STM-16) and requires adapter unit retiming/regeneration at this rate |
| 0111 | Indicates that the payload data rate is 9.95328 Gbits/s (STM-64) and requires adapter unit retiming/regeneration at this rate |
| 1000 to 1110 | Unused |
| 1111 | Indicates sending client signal fail (for example signal interruption) |

Finally, the bit interleaved parity overhead bytes BIP, namely overhead bytes $E_1$ to $E_8$, include a BIP-8 parity check value; a detailed definition is provided in ITU standard G. 707 which is hereby incorporated by reference. Each frame has its associated BIP parity value which provides a parity check for the payload data of the frame. In the multiframe shown illustrated in FIG. 6, the inventors have appreciated that it is preferable to have a BIP byte associated with each frame rather than clustering the BIP bytes, for example at the end of the multiframe. Such BIP byte allocation to each frame reduces the need for high-speed memory at the receiving unit 40 of the channel 10. Thus, distributing the BIP overhead bytes in the frames is preferable to concatenating the BIP bytes together in the multiframe. The BIP code provides a direct indication of bit error rate in the payload data because the ration of the number of the payload bits to the number of overhead bits is maintained in the system 300 in a fixed ratio.

It will be appreciated that modifications to the channel 10 and the system 300 and their method of operation can be made without departing from the scope of the invention.

For example, although overhead data and payload data are interleaved in the adapter unit 110 in a fixed ratio of 1:31 bits, other ratios are possible. The adapter units 110, 210 can be modified so that the ratio is in a range of 1:2 bits to 1:100 bits depending upon the degree of overhead control required. An important point is that the ratio should be fixed and not dynamically variable as in prior art communication systems where justification is employed.

Moreover, in the channel 10 and system 300, the number of frames comprising a multiframe can be altered from eight frames comprising a multiframe as aforementioned. For example, the number of frames forming a multiframe can be varied in a range of 2 to 100, although including more than 50 frames in a multiframe makes synchronization more difficult at the receiver unit 40.

Furthermore, in FIG. 6, positions of the overhead bytes performing specific functions can be altered provided they continue to perform their associated functions, for example, positions of the MIC and PTI overhead bytes can be exchanged in a modified version of the multiframe. Additionally, the BIP overhead bytes of each frame can be arranged to be included at the last overhead byte of each frame, for example at overhead byte $H_1$ for frame 1.

As aforementioned, the fibre link 30 can comprise one or more optical fibres. In alternative versions of the channel 10 and system 300, the fibre link 30 can be substituted with a radio link, for example a satellite microwave link. Where lower data rate operation is employed, the fibre link 30 can be replaced with one or more coaxial cable wire connections; such coaxial links generally have a lower data carrying capacity compared to optical fibre connections.

We claim:

1. A method of communicating data in communication systems (300), each system including at least one channel (10) comprising transmitting means (20), receiving means (40) and data conveying means (30) for conveying data from the transmitting means (20) to the receiving means (40), the method comprising the steps of:

(a) combining payload data and overhead data at the transmitting means (20) to form aggregate data (600) thereat for transmission to the receiving means (40), the aggregate data (600) being partitioned into frame-like structures in which the number of overhead data bits is in a fixed ratio relative to the number of payload data bits;

(b) transmitting the aggregate data (600) from the transmitting means (20) to the receiving means (40) through the conveying means (30);

(c) receiving the aggregate data (600) at the receiving means (40), decoding the aggregate data to isolate the overhead data from the payload data thereat, and interpreting the overhead data for controlling and managing the payload data within the system (300), and operating the transmitting means (20) to generate the aggregate data (600) at a rate which is greater than the rate of receipt of the payload data thereat by substantially a fraction $^{(Rp+Ro)}/_{(Rp)}$, where Rp is the rate of receipt of the payload data at the transmitting means (20) and Ro is the rate at which the overhead data is added at the transmitting means (20) to generate the aggregate data (600).

2. A method according to claim 1 wherein the fixed ratio of payload bits to overhead bits is in a range of 2:1 to 100:1.

3. A method according to claim 2 wherein the fixed ratio of payload bits to overhead bits is 31:1.

4. A method according to claim 1, wherein the system is operable not to apply further justification to the payload data when generating the aggregate data (600).

5. A method according to claim 1, wherein the number of overhead bytes indicative of error rate occurrence within the aggregate data to the number of payload bytes are in a fixed ratio, thereby providing a fixed density of error rate bytes to payload bytes.

6. A method according to claim 5 wherein the number of overhead bytes indicative of error rate occurrence to the number of corresponding payload bytes is in a fixed ratio of 1:248.

7. A method according to claim 1 wherein the system (300) includes a plurality of channels (20a, 20b, 40a, 40b), each channel (20a, 20b, 40a, 40b) capable of adapting to the data rate of its associated payload data, the channels (20a, 20b, 40a, 40b) thereby capable of functioning mutually asynchronously.

8. A method according to claim 1, wherein the overhead data and the payload data are interleaved in the aggregate data (600).

9. A method according to claim 1, wherein the frame-like structures comprise a plurality of frames (600) organized into multiframes (FIG. 5), the frames and multiframes identifiable at the receiving means (40) by interpreting the position of overhead data within the aggregate data.

10. A method according to claim 9 wherein each multiframe comprises in a range of 2 to 100 frames.

11. A method according to claim 10 wherein each multiframe comprises 8 frames.

12. A method according to claim 9, wherein the overhead data associated with each multiframe comprises a synchronizing code (FAW) for assisting the receiving means to synchronize to the multiframes.

13. A method according to claim 12 wherein the synchronization code comprises four synchronization bytes (FAW1 to 4) in the overhead data.

14. A method according to claim 12 wherein the four synchronization bytes (FAW1 to 4) have binary values of $1111\ 0110_b$, $1111\ 0110_b$, $0010\ 1000_b$ and $0010\ 1000_b$ allocated thereto respectively.

15. A method according to claim 9 wherein the overhead data associated with each multiframe comprises an identity code (MIC) for use in identifying the multiframe.

16. A method according to claim 15 wherein the identity code (MIC) is incremented for successive multiframes.

17. A method according to claim 15 wherein the identity code (MIC) is incremented in modulo manner.

18. A method according to claim 16 wherein the identity code (MIC) is incremented in steps of a plurality of counts for successive multiframes.

19. A method according to claim 16, wherein the receiving means is operable to determine whether or not multiframes are missing by monitoring that the identity code (MIC) is consistently incremented from multiframe to multiframe.

20. A method according to claim 9 wherein the overhead data associated with each multiframe comprises balancing code (BAL) for ensuring that the overhead bytes associated with the multiframe include substantially equal numbers of 0's and 1's.

21. A method according to claim 9 wherein the overhead data associated with each multiframe comprises trail trace identification code (TTI) for use by the receiving means for confirming whether or not it is connected to its correct corresponding transmitting means (20).

22. A method according to claim 9 wherein the overhead data associated with each multiframe comprises automatic protection switching code (APS) for instructing the system (300) to use alternative channels to convey the payload data in the event of channel failure within the system (300).

23. A method according to claim 9 wherein the overhead data associated with each multiframe comprises a bit interleaved parity (BIP) code for each frame of the multiframe, the interleaved parity code usable by the receiving means (40) for detecting the occurrence of corruption of payload data associated with the frame.

24. A method according to claim 9 wherein the overhead data associated with each multiframe comprises a payload type indicator (PII) code indicative of payload data rate input to the transmitting means (20).

25. A method according to claim 1 wherein the transmitting means (20) is operable to receive the payload data as serial data and convert it to parallel data ($D_0$ to $D_{30}$) for combining with the overhead data ($K_0$) to generate the aggregate data (600) as serial data for transmission through the conveying means (30).

26. A communication system for communicating data, comprising:
   a) at least one channel comprising transmitting means, receiving means, and data conveying means for conveying data from the transmitting means to the receiving means;
   b) means for combining payload data and overhead data at the transmitting means to form aggregate data thereat for transmission to the receiving means, the aggregate data being partitioned into frame-like structures in which the number of overhead data bits is in a fixed ratio relative to the number of payload data bits;
   c) means for transmitting the aggregate data from the transmitting means to the receiving means through the conveying means;
   d) means for receiving the aggregate data at the receiving means, decoding the aggregate data to isolate the overhead data from the payload data thereat, and interpreting the overhead data for controlling and managing the payload data within the system; and
   e) said transmitting means being operable to generate the aggregate data at a rate which is greater than the rate of receipt of the payload data thereat by substantially a fraction $(Rp+Ro)/(Rp)$, where Rp is the rate of receipt of the payload data at the transmitting means and Ro is the rate at which the overhead data is added at the transmitting means to generate the aggregate data.

27. A system according to claim 26, wherein the transmitting means (20) incorporates an adapter unit (110) for combining the payload data with the overhead data to generate the aggregate data (600), and the receiving means (40) incorporates a corresponding adapter unit (210) for decoding the aggregate data to separate the payload data from the overhead data.

28. A system (300) according to claim 26 including a plurality of channels (20a, 20b, 40a, 40b) operable to adapt to the rate at which they receive payload data, the channels (20a, 20b, 40a, 40b) thereby capable of operating mutually asynchronously.

29. A system according to claim 26 wherein each adapter unit (110, 210) incorporates an electrical multiplexer (510) and an electrical demultiplexer (500) for converting data serially input thereto into parallel data ($D_0$ to $D_{30}$) for processing within the adapter unit (110, 210)) and back into serial data again after processing is performed in the adapter unit (110, 210).

* * * * *